May 19, 1953     B. B. SCOTT, JR     2,639,097
COIL WINDING
Filed June 5, 1946     3 Sheets-Sheet 1
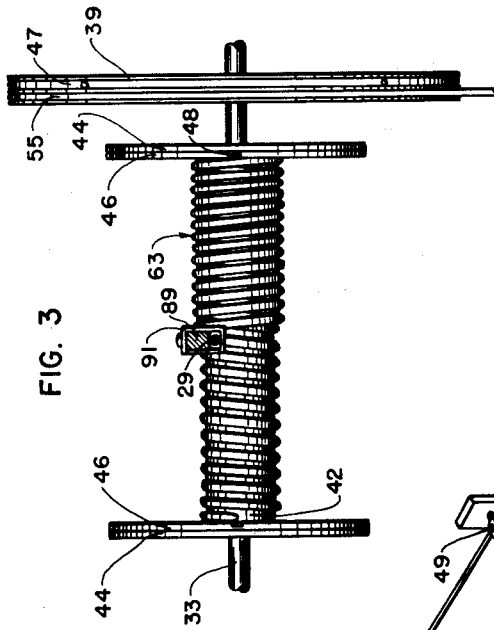
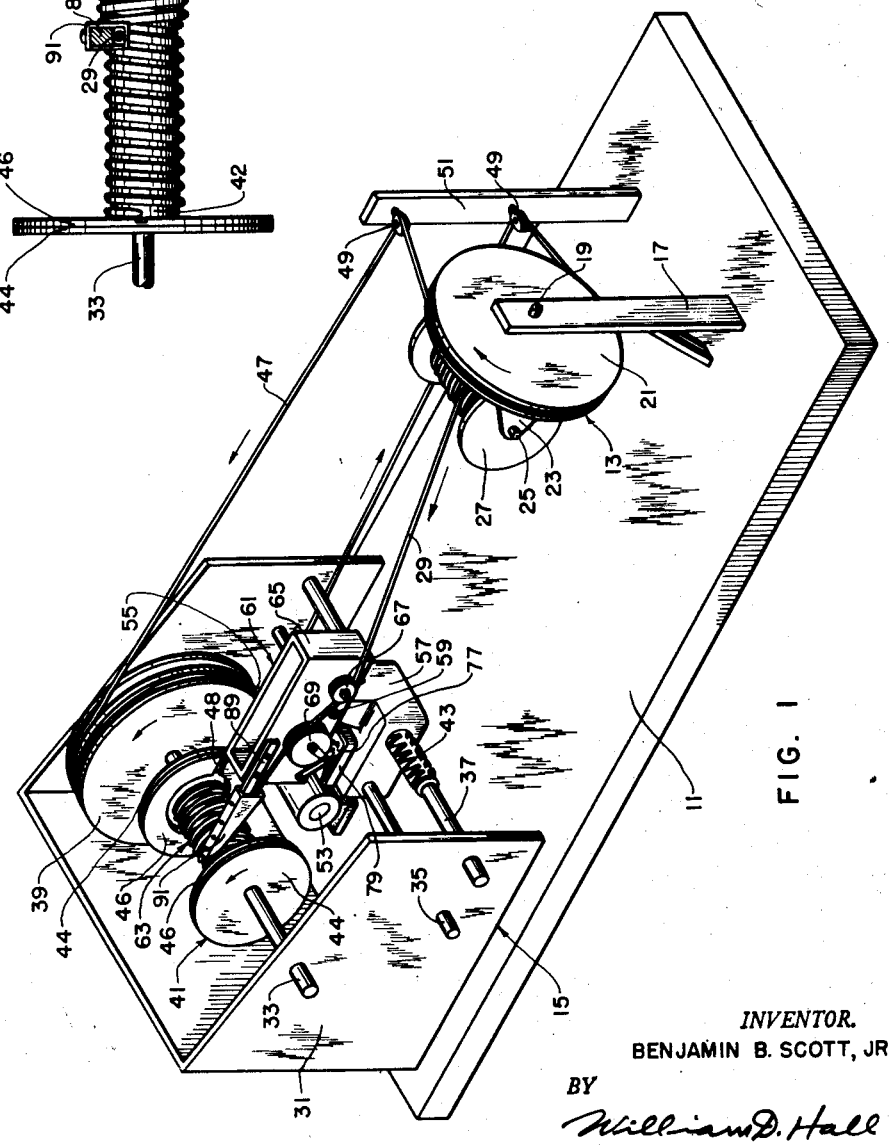
INVENTOR.
BENJAMIN B. SCOTT, JR.
BY
William D. Hall,
ATTORNEY May 19, 1953 — B. B. SCOTT, JR — 2,639,097
COIL WINDING
Filed June 5, 1946 — 3 Sheets-Sheet 2
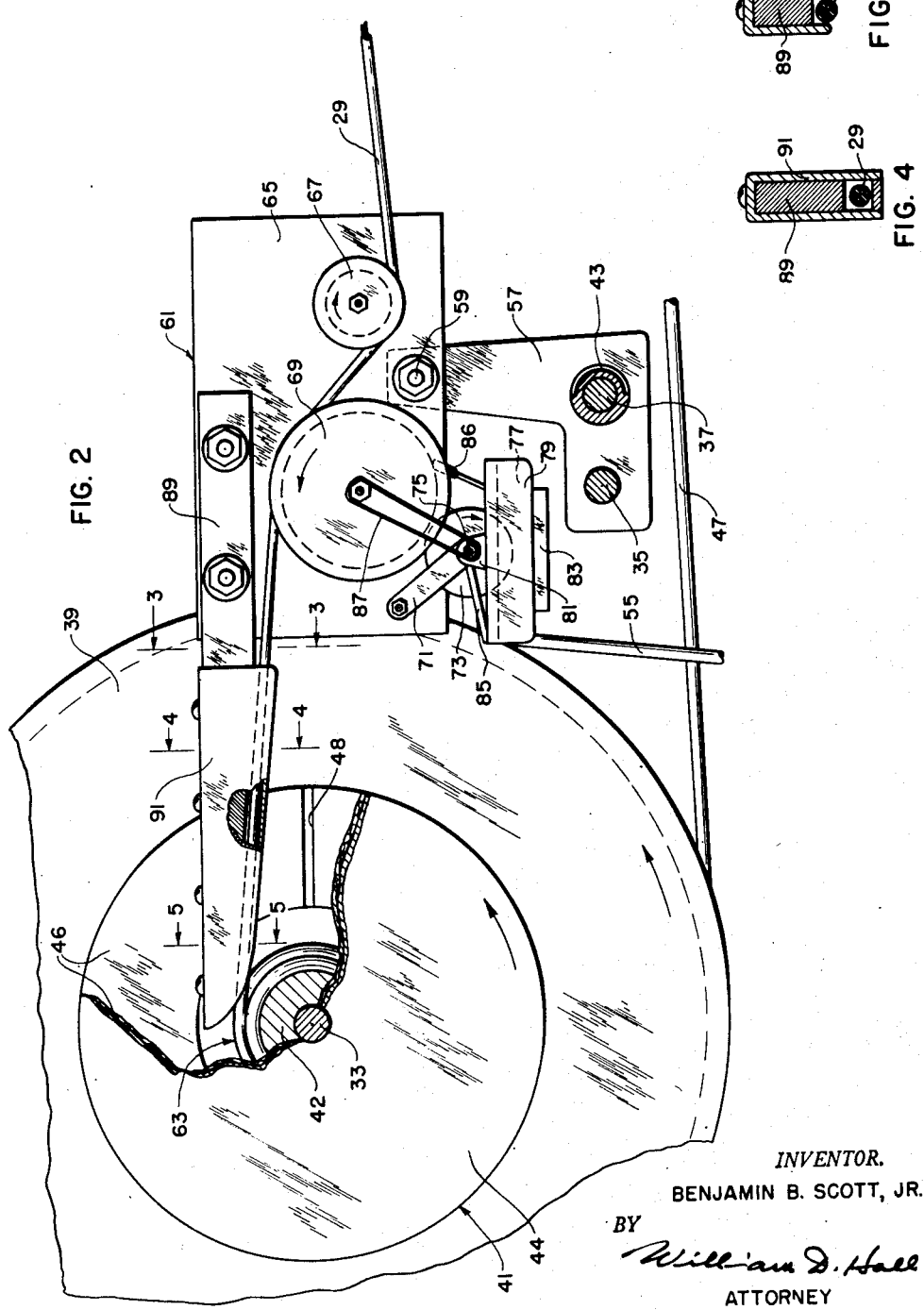
INVENTOR.
BENJAMIN B. SCOTT, JR.
BY William D. Hall
ATTORNEY May 19, 1953 B. B. SCOTT, JR 2,639,097
COIL WINDING Filed June 5, 1946 3 Sheets-Sheet 3

Inventor
BENJAMIN B. SCOTT, JR.

By William D. Hall.
Attorney

Patented May 19, 1953

2,639,097

UNITED STATES PATENT OFFICE 2,639,097

COIL WINDING

Benjamin B. Scott, Jr., Pittsburgh, Pa.

Application June 5, 1946, Serial No. 674,411

9 Claims. (Cl. 242—10)

(Granted under Title 35, U. S. Code (1952), sec. 266)

The invention described herein may be manufactured and used by or for the Government for governmental purposes, without the payment to me of any royalty thereon.

The present invention relates to improvements in coil winding, and more particularly to the features which I will refer to herein as "turn-to-turn restraint" and "turn-to-container restraint" as hereinafter described at length.

In the present application, the invention will be illustrated in connection with coils of insulated electrical wire, for telephone and telegraph communication, but it will be understood that the invention is applicable to many other elongated coilable materials, such as rope, twine, flexible tubular conduit for electrical wires, multiple conductor cables, uninsulated wire, flexible stranded wire rope, etc., and hence should not be deemed to be limited to the illustrated embodiment.

As used in the present application, the word "coils" shall be used in its broadest sense, and shall be deemed to include any and all types of windings of elongated materials (such as rope, wire, etc.), wherein the said material is wound about an axis, irrespective of the geometrical shape (as spherical, cylindrical, etc.) and irrespective of the type of winding (as level layer wound, honeycomb, etc.) and irrespective of the pitch at which the turns are wound.

In the present application when the term "turn-to-turn restraint" is used it shall connote some means whereby the various turns of wire or other material of a coil are held in place relative to each other, such as by a suitable bonding agent (as rubber cement) which has sufficient tenacity to retain said respective turns against separation from each other until such time as separation thereof is desired, as when the turns are individually pulled from the coil when the wire is being payed out therefrom. The restraining means may be applied in any suitable manner as by dipping a wound coil in a bath of wax or the like, or coating the wire with rubber cement as it is being wound, or by incorporating a suitable adhesive material in the insulation of the wire and then subjecting the wound coil to a certain degree of heat so as to bond the turns to each other. Again, the restraint may be obtained by tying the several turns of a coil to each other as by strips of Scotch tape interposed between successive layers or even tying them together by light thread or the like.

The term "turn-to-container restraint" shall indicate a similar restraining means applied between a container and those turns of a coil which are to be unwound last during the laying process, so that, even as said last turns are unwound during the laying operation, they too will pay out only one turn at a time and will not come out in a tangled bunch. It will be seen that, if the coil is of the type which is unwound from the inside, "turn-to-container restraint" will be applied to the turns of the outermost layer, whereas, if the coil is of the type which is payed out from the outside, then the "turn-to-container restraint" will be applied to the turns of the innermost layer.

The conventional manner of paying out or laying telephone wire and the like is to unwind it from a spool or reel, which is rotated about its axis during the laying process. This method has a number of drawbacks (particularly objectionable in military use), among which are the fact that it requires a certain amount of heavy equipment, namely the reels and equipment to rotatably sustain the reels during unwinding; that friction and the inertia of the reels and the wire thereon must be overcome as the wire is unwound so that laying at high speeds is not practicable; that it usually is noisy in operation (which is especially objectionable when military communication wire is being laid within earshot of the enemy); and that continuous telephone or telegraph communication through the wire during the paying out operation is not possible.

Efforts to overcome the said objectionable characteristics have resulted in attempts to wind satisfactory coils of wire having hollow centers, so that the wire could be drawn out from the center without rotating said coils about their axes. This was an improvement in some respects but, prior to the invention covered in the present application, it was found that, in the use of such coils, certain other objectionable characteristics appeared. For example, during laying, as one turn of the wire was being withdrawn, it would catch several additional turns of the same layer, or even of other layers, and pull them out with it, thus resulting in snarls, knots, severe strains and even fractures of the wire, abrasions of the insulation, deformations of the lay-twist, etc. These objectionable characteristics are particularly likely to occur when but a few turns or but a few layers of the coil remain unwound, at which time all of said turns or layers may collapse completely and be fed out as a hopeless snarl. As a result of the foregoing the wire might be so damaged as to be unusable for communication purposes and also the effective length thereof might be greatly shortened. Also in such coils there was a great likelihood that, during ordinary handling of the coils before use or as they were being put into use, portions of the coils would collapse so as to make the coils unusable.

Thus, said coils were found to be self-unloading at times when this was not desired. The weight of a few feet of wire hanging out of a coil or the accidental turning of a coil on its side might cause all of the wire in the coil to drop out in a tangle. This condition might be so bad that on occasion large portions of the coil might "spring" or "explode" out of the coil in snarled bunches, thus making the coil unusable.

It is therefore an object of the present invention to provide coils of wire and the like, and methods and means of winding them, so that the turns thereof are retained in place during handling, transportation, and preparation for use, and during the actual laying thereof, so as to avoid loosening up and separation of the individual layers and turns.

It is another object to provide methods and means of winding wire and the like so as to preclude the formation of knots, kinks, snarls, bunches, sharp bends, etc., in the wire when it is paid out.

It is another object to provide coils of wire and the like, and methods and means of winding them, in which are incorporated means for holding each turn, including each turn of the outermost and innermost layers, in its predetermined position, so that it remains in place until actually pulled out during the laying operation.

It is another object to provide a coil of wire or the like in which the turns remain in place until a certain predetermined minimum quantum of tension is applied (as in the paying out operation) to dislodge them, thereby preventing the accidental self-unloading of a coil, or the laying of an excess amount of wire therefrom.

It is yet another object to provide a coil which may be played out satisfactorily at both high and low speeds.

It is still a further object to provide methods and means whereby wire or the like, while being wound into coils, may be provided with "turn-to-turn restraint" and "turn-to-container restraint" so that, when it is unwound it feeds out evenly and only to the extent, and at the speed, desired and without any objectionable twists, snarls, knots, etc.

It is still a further object to provide coils of wire or the like, and methods and means of winding them, so as to eliminate the need of reels or heavy laying equipment, or the noises produced thereby, and also to greatly reduce the amount of time and labor ordinarily required for the laying operation.

It is a further object to provide a coil of wire or the like which may be laid or fed out satisfactorily without the need of any moving parts.

It is a further object to provide coils of wire and the like, and methods and means of producing them, in which are incorporated the feature of "pretwisting" (covered in my copending application, Serial Number 674,412) in combination with "turn-to-turn restraint" and/or "turn-to-container restraint" (which are covered in the present application).

These and other objects and advantages of my present invention, which will be better understood as the detailed description progresses, are obtained in the following manner.

I provide a method and means of winding coils of coilable elongated material so that each of the individual turns thereof is maintained in a predetermined position relative to the other turns of the coil ("turn-to-turn restraint"), by means of suitable adhesive or retaining means interposed between the several turns. Thus each turn is bonded to other turns with which it comes in contact. Said adhesive or retaining means may be rubber cement, wax, glue or the like which is preferably applied to the elongated material during the winding thereof, or it may be in the form of strips of adhesive material, such as Scotch tape, suitably positioned between the layers and/or the individual turns.

I apply the same principle to the outermost or innermost turns (whichever are to be paid out last in a particular coil), which are proximate to the coil container ("turn-to-container restraint"), so that the elongated material feeds out only as it is actually pulled out during laying, even to the very end thereof. This bonding may be done in various ways, although, if the coil is the type which is to be unwound from the inside, I prefer to apply Scotch tape or the like to the outermost layer of the coil and then glue a stiff half corrugated cardboard or the like about said tape so that even the turns of said outermost layer will feed out individually only when they are actually pulled out during the laying operation. If the coil is of the type to be unwound from the outside, it may be wound about a tube of cardboard or the like to which the turns of the innermost layer may be bonded.

Although in the present application the invention will be illustrated as applied to coils which are payed out from the inside, it will, of course, be understood that the invention is applicable to other types of coils.

It should be noted that, while I find that "turn-to-turn restraint" and "turn-to-container restraint" make for greatly improved coils, it is advisable for certain uses (and particularly for laying communication wire at high speeds) that "pretwisting" of the turns, preferably to the extent of approximately one revolution of pretwist per turn, be incorporated into each coil and also that each coil be packed in an improved type of container. Preferred methods and means for applying "pretwisting" are disclosed in my copending application, Serial Number 674,412, and improved packaging means are covered in my copending application, Serial Number 674,410.

In the accompanying specification there is described, and in the annexed drawings illustrated, what are at present considered preferred embodiments of my invention. It is, however, to be understood that the said invention is not to be limited to said embodiments inasmuch as changes may be made without the exercise of invention and within the true spirit and scope of the appended claims.

In the drawings,

Figure 1 is a perspective view of a machine for winding coils of wire and the like incorporating "turn-to-turn restraint" and "turn-to-container restraint";

Figure 2 is an enlarged side elevational view of the wire guide, and adhesive applying assembly of the machine of Figure 1;

Figure 3 is a fragmentary view, taken along the line 3—3 of Figure 2, but of reduced size, showing the winding reel and associated parts;

Figure 4 is a transverse sectional view of the wire guide, taken along the line 4—4 of Figure 2;

Figure 5 is a similar view, taken along the line 5—5 of Figure 2;

Figure 6:
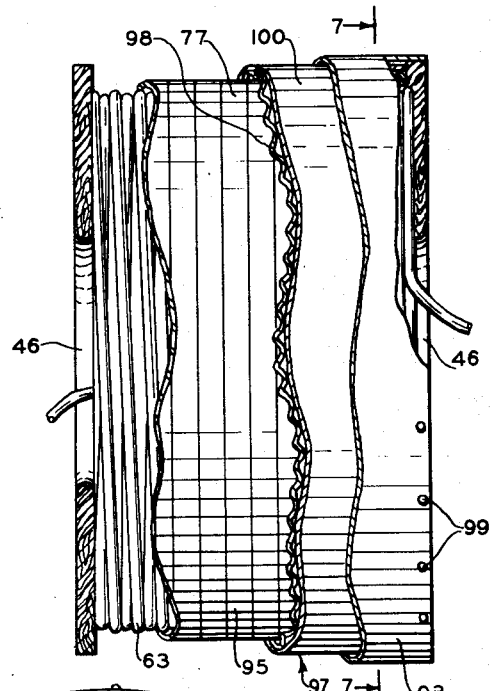
Figure 6 is an enlarged elevational view, partly broken away and partly sectioned, illustrating the application of "turn-to-container restraint" to a coil of wire wound on the machine of Figure 1.

Referring now to the drawings, Figure 1 shows a coil winding machine embodying the present invention. Said machine includes a base 11, upon which are mounted a pretwisting unit 13 and a winding unit 15.

The pretwisting unit 13 includes a suitable support 17 which sustains a horizontally disposed pretwist shaft 19. Freely rotatable about said shaft 19 is a pretwist pulley 21, to one face of which is secured a yoke 23 which supports a supply reel axle 25 parallel to the face of the pulley 21. Freely rotatable upon the supply reel axle 25 is a supply reel 27 of wire 29. The axle 25 is removable to allow replacement of the supply reel 27. Although not illustrated in the drawings, any conventional type of antibacklash means, or braking means, may be fitted to the pretwisting unit 13 so as to keep the wire 29 taut during the winding operation and to avoid overrunning of the supply reel 27.

The winding unit 15 is made up of a framework 31 which sustains three mutually parallel, horizontally disposed shafts 33, 35, 37. The winding shaft 33 is freely rotatable and has rigidly secured to it a double grooved winding pulley 39 and a winding reel 41. The guide shaft 35 is nonrotatably secured to the frame 31. The transverse shaft 37 is fitted with a reverse threaded, traverse cam 43 of the conventional type and is also provided with any conventional means (not shown) for rotating it, as is well known in the art.

The winding reel 41 (see Figures 1 and 2) should be of a type provided with a core 42 and two end plates 44, at least one of which is removable to allow the removal of a finished coil 63 wound thereon. Disposed about the core 42 and just inside the two end plates 44 respectively are a pair of flat ring-shaped end members 46 which, as hereinafter explained, will become the ends of a package for the coil 63. At least one of said end members 46 has one radially disposed slot 48 on its inner surface. Although various types of containers to suit different requirements may be made for the coil 63 of the present application, a preferred form of container, and the one which is illustrated in the drawings attached hereto, is described fully in my copending application, Serial Number 674,410.

One groove of the pulley 39 is coupled to the pretwist pulley 21 by means of the pretwist pulley cord 47. Said pulley cord 47 passes through a pair of direction changing pulley blocks 49 sustained by a vertical standard 51. The second groove of the winding pulley 39 is coupled to an electric motor 53 by means of a winding pulley cord 55.

As may be seen in Figures 1 and 2 the shafts 35 and 37 support a reciprocating platform 57 which is horizontally slidable along the guide shaft 35 and is caused to reciprocate by the traverse cam 43 on the traverse shaft 37. Pivotably sustained upon the reciprocating platform 57 by means of the pivot pin 59, is a wire feed assembly 61. Said wire feed assembly 61 serves the purposes of feeding the wire 29 to the winding reel 41 and also applies a turn-to-turn restraining means to said wire as it is being fed.

Said wire feed assembly 61 comprises a rectangular framework 65, provided on one side near its rear end with a freely rotatable grooved tension wheel 67 and farther forward with a freely rotatable grooved adhesive applicator wheel 69. Forward of said applicator wheel 69 is a finger 71 pivotably secured at its upper end to the framework 65 and provided at its lower end with a horizontally disposed shaft 75 upon which is a freely rotatable adhesive pick-up wheel 73 which extends into the groove of the wheel 69 and also dips into a bath of suitable adhesive 77 which is located in an adhesive can 79. Said adhesive can 79 is secured to the shaft 75 by means of two tabs 81.

The adhesive can 79 is free to swing about said shaft 75 but is provided with a weight 83 so that it maintains a level position under all conditions of operation. The pick-up wheel 73 is provided with a notched wiper plate 85 adapted to wipe off any excess adhesive 77 picked up by said wheel and the adhesive applicator wheel 69 may be provided with a brush 86 which extends into the groove of said wheel 69 to remove any excess of adhesive 77 from said groove. The pick-up wheel 73 is maintained in intimate contact within the said groove of the adhesive applicator wheel 69 by means of a spring means 87, which may be an elastic band.

Extending forward from the framework 65 is a feed arm 89, the forward portion of which is encircled by a chute 91. Said chute 91 is a tubular member of rectangular cross section (Figure 4) which forms a conduit below the arm 89 to allow the passage therethrough of the wire 29. At the forward end of the chute 91 however it has the shape (Figure 5) of an inverted U in cross section, the two sides of the U extending down beyond the arm 89 being of less vertical height than the least diameter of the wire 29 to be fed therethrough.

Although not illustrated, it is preferable that the machine of Figure 1 be provided with different sized reels 27, 41, and with several traverse cams 43 having different characteristics of pitch and width, and with several chutes 91 to accommodate different sizes and types of wire 29.

In the operation of the winding machine just described, a supply reel 27 is secured to the shaft 25, and an empty winding reel 41 to the shaft 33. Although not illustrated in the drawings, it will be understood that said shafts 25, 33 should preferably be fitted with some conventional means to facilitate the expeditious removal of said reels 27, 41 from said shafts and the replacement thereof. In place on said winding reel 41 (see Figure 3) are a pair of end members 46 which are flat rings, of wood or the like, one of which is provided on its inner surface with a radially disposed slot 48. The end of the wire 29 on the supply reel 27 is threaded under the tension wheel 67, over the applicator wheel 69, and through the chute 91 and is then fastened to the core 42 of the winding reel 41, care being taken to see that the applicator wheel 69 has picked up sufficient adhesive 77 to coat said wire therewith.

The motor 53 may then be started, whereupon, by means of the pulley cord 55, the reel 41 is caused to rotate (in the direction of the arrow), thus winding the wire 29 upon said reel. As shown in Figure 2, the tension wheel 67 and applicator wheel 69 are so positioned that the wire 29 must make two bends in passing between them, and hence said wire is pressed tightly into the groove of the applicator wheel 69, and is coated with adhesive 77 which is picked up by the pick-up wheel 73 and is carried thereby to said groove.

The traverse shaft 37 is rotated in the usual manner by any conventional gear means (not shown), to cause the traverse platform 57 to reciprocate along said shaft 37 so that the coil 63 is wound one layer at a time.

As each turn of wire 29 of the coil 63 is wound into place, it is bonded to all other turns which it crosses by means of the coating of adhesive 77. It will be noted (see Figure 2) that the chute 91 is so positioned that it feeds the wire 29 on to the coil 63 substantially at a tangent, and this tangential relationship is maintained as each additional layer of wire 29 is put upon the coil 63 because the chute 91 pivots about the pivot pin 59.

As the chute 91 tapers toward its outer end, as already explained, the metal of the chute never comes into physical contact with any turns of wire 29 already wound upon the coil 63 and hence there is no possibility that the chute will cause any damage thereto. Nevertheless, the chute 91 is able to feed the wire 29 to the coil 63 at exactly the position desired. This is not possible with any feeding device which does not control the wire right up to the point of contact with the coil 63.

As the chute 91 feeds the wire 29 to the coil 63, it is held in place thereon by the adhesive 77 as already mentioned and hence every turn of the coil 63 is in its predetermined position so that a symmetrical and uniformly wound coil results.

Although coils may be wound with "turn-to-turn restraint" as just described, but without "pretwisting" the wire (see my copending application, Serial Number 674,412 for the advantages of pretwisting), it is preferable to combine turn-to-turn restraint with pretwisting for most applications and hence the winding apparatus illustrated herein is adapted to incorporate both characteristics in coils wound thereon. If desired, however, the pretwisting feature may be omitted in the winding of particular coils by merely removing the pulley cord 47 and locking the pretwist pulley 21 against rotation about the shaft 19.

Assuming however that pretwisting is desired, the operation is as follows: The pulley 21 is rotated by means of the pulley cord 47, thereby rotating the supply reel 27 bodily about the axis of the shaft 19. As the two pulleys 21, 39 are of the same diameter, the wire 29 will receive one complete revolution of pretwist for each turn of wire which is wound upon the coil 63.

When sufficient wire 29 has been wound on to the coil 63, the end of the wire at the outside of the coil is threaded through the slot 48 to the central cavity of the coil.

"Turn-to-turn restraint," as just described, avoids snarls, etc., in all turns of the coil except those of the outermost layer. Hence it is requisite that some restraining means be provided between the outer layer of turns and the inside of the package. This may be accomplished by coating said turns well with the adhesive agent 77 and fixing the cylindrical wall 93 of the container into place, making sure that it is in contact with said adhesive, and then securing said wall 93 to the end members 46. However, this makes the size of the outside diameter of the coil 63 critical relative to the inside diameter of the wall 93, and hence I have found it desirable to interpose a fairly stiff liner of half corrugated cardboard 97 or the like inside the wall 93 and to secure the outermost turns of the coil 63 to the inner surface of said liner.

Thus, in a preferred embodiment, I wind Scotch tape 95 (see Figures 6 and 7) about the coil 63, each turn of Scotch tape overlapping the previous turn to the extent of approximately one-half, and I then paint the back of the Scotch tape 95 well with a coating of adhesive agent 77, and then wrap a sheet of half corrugated cardboard 97, or the like, tightly about said adhesive covered Scotch tape 95. By "half corrugated cardboard," I mean that type which is made up of one sheet of corrugated cardboard 98 and one sheet of flat cardboard 100. Thus it may be easily flexed about an axis parallel to the corrugations, but not about an axis perpendicular thereto. I prefer to paste the half corrugated cardboard 97 on with the corrugated sheet 98 facing inwardly, that is in contact with the Scotch tape 95. Hence, a suitable restraint is set up between the outer layer of turns of the coil 63 and the Scotch tape 95 and between said Scotch tape and the half corrugated cardboard 97. Then the cylindrical wall 93, which is preferably made of sheet metal, may be wrapped about the cardboard 97 and fastened to the peripheral edges of the end members 46 with suitable fastenings, such as tacks 99.

It will now be seen that a restraint has been set up between each turn of wire 29 of the coil 63 and every other turn with which it comes in contact ("turn-to-turn restraint") and between each of the turns of the outermost layer and the inner surface of the cylindrical liner of half corrugated cardboard 97 ("turn-to-container restraint").

In the laying of wire 29 from one of the coils 63, as just described, all of the turns of wire will remain in position until they are actually pulled out of the coil during the laying operation. No wire 29 will loosen up until actually pulled and hence it is impossible for several turns of wire or even several layers to "spill" out of the coil or to be pulled out therefrom simultaneously to result in snarls, knots, kinks, abrasions, breaks, etc. In coils wound without "turn-to-turn restraint" and "turn-to-container restraint," several turns or layers may spring out at one time, resulting in a hopeless tangle and thereby shortening the effective length of the wire paid out and frequently resulting in a break in the conductor and thus making the entire laying operation useless.

The pretwisting of the wire, mentioned above, is fully described and explained in my copending application, Serial Number 674,412. Hence, it need only be stated in the present specification that combining the pretwisting feature with "turn-to-turn restraint" and "turn-to-turn container restraint" makes for a coil wherein the wire feeds evenly and smoothly and without kinks, knots, bends, undue torsional stresses, snarls, lay twist deformations, etc.

Figures 7, 8:
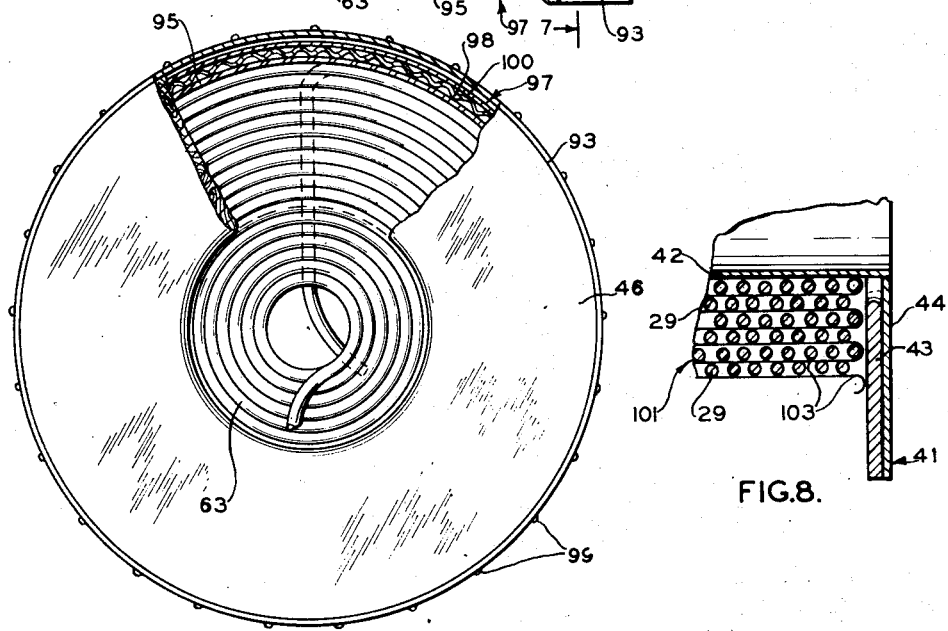
Figure 7 is a left end view, partly broken away and sectioned along the line 7—7 of Figure 6, of the packaged coil of wire of said figure.
Figure 8 is a fragmentary sectional view of a modified means of applying "turn-to-turn restraint" to a coil in the form of Scotch tape.

A modified form of "turn-to-turn restraint" is illustrated in Figure 8. Here, the "turn-to-turn restraint" is accomplished with Scotch tape 103, or the like, which is interposed between successive layers of wire 29 of the coil 101.

To wind such a modified form of coil 101 a single layer of wire 29 may be wound on the core 42 of a winding reel 41. A plurality of strips of Scotch tape 103 (preferably an even number such as six or eight strips) are positioned on said turns, alternate strips having their tacky surfaces in contact with said turns and the other strips with their nontacky surfaces in contact with said turns. Said strips of tape 103 are placed parallel to the axis of the core 42 and are positioned at spaced intervals about the periphery of the turns and they should extend along the full length of the coil 101.

The rolls (not shown) from which said strips of Scotch tape 103 are being unwound may then be temporarily secured to one of the end plates 44 of the winding reel 41 while a second layer of wire 29 is wound over the first layer and over the strips of Scotch tape 103 extending along said first layer as already mentioned. Then the several rolls of Scotch tape 103 are all moved to the other end of the reel 41 and are temporarily secured to the other end plate 44, so that a plurality of strips of said tape extend lengthwise over said second layer. This process is continued, the strips of Scotch tape 103 being positioned along each turn, until the entire coil 101 is wound. Thus the strips of Scotch tape 103 zigzag back and forth, first over one layer of wire 29 in one direction and then back over the next layer in the opposite direction, and so on. This construction effects a "turn-to-turn restraint" similar to the adhesive agent 77 mentioned above.

As the wire 29 is withdrawn from the center of the coil 101 during the paying out thereof it is restrained by the Scotch tape 103 to which it adheres, and a certain amount of force is required to pull it away from said tape. Thus the turns remain in position until they are pulled therefrom during the paying out operation.

It should be noted that, in winding coils of different sizes and shapes, and having different types of windings, and different pitches of turns, and of different elongated materials, the restraint means used must be such as to give the desired result. Thus, the restraint means must have sufficient tenacity or tensile strength so that it will resist any forces which might have a tendency to displace the turns of the coil until such time as the coil is actually payed out, at which time the pull on the elongated material should be sufficient to break the restraint means.

I have found in winding some coils that too strong a restraint may impede the paying out operation (as where a coil of telephone wire is to be payed out at slow speed by a person on foot carrying the coil in a pack upon his back). Under such circumstances the amount of restraint should be reduced.

One means of reducing it is to interpose strips of paper, such as narrow strips of crepe paper, between successive layers. These strips may be positioned in the coil in a manner somewhat similar to the positioning of the strips of Scotch tape 103 in the modified form of coil shown in Figure 8. Wherever such a strip of crepe paper is interposed it will reduce the adhesive bond between turns which otherwise would result from the use of the adhesive 77. Thus, less pull is required to release the turns during paying out.

Although not shown, it will of course be understood that any suitable power transmission means, such as gear trains, chain drives, friction clutches, etc., may be substituted for the pulleys 21, 39 and pulley cords 47, 55 illustrated.

It should be understood that in pretwisting elongated materials, such as wire, the elastic limit of the material should be taken into consideration, because if it is pretwisted beyond its elastic limit it is likely to take a "set" and hence will not untwist into a perfectly straight conformation. Therefore it may be advisable to give a greater amount of pretwist than one revolution of pretwist per turn to some portions of the coil and a lesser amount of pretwist to other portions thereof. For example, in turns of relatively large diameter and circumference, more pretwist than one revolution may be safely given without any undesirable "set" resulting, whereas, in turns of relatively small diameter and circumference, it may be unwise to apply a full revolution of pretwist. Thus, in winding coils of some types of elongated materials it may be good practice to use some conventional form of variable speed drive so as to reduce the pretwist to turn ratio throughout the inner layers of the coil and increase said ratio throughout the outer layers of the coil.

As already stated above, the present invention may have many applications. For example, it may be used in connection with winding coils of rope for use with a Lyle gun or other propelling means to span the distance from shore to a stranded vessel for a breeches buoy. When so used, the rope will pay out of the coil smoothly and evenly and without twists, kinks, knots, etc.

While there have been described what are at present considered preferred embodiments of my invention, it will be obvious to those skilled in the art that many changes and modifications may be made therein without departing from the invention and it is aimed in the appended claims to cover all such changes and modifications as fall within the true spirit and scope of the invention.

What is claimed is:

1. In a coil, a plurality of turns of elongated material about an axis, each of said turns having a pretwist, a container encompassing said coil, an adhesive means between each of said turns and at least some other turns with which it comes in contact, an adhesive means between each of the outermost turns and the interior of the container, both of said adhesive means having substantially only sufficient resistance to separation so as to maintain adhesion under ordinary handling but being easily broken under the pull sustained by the turns during the paying out thereof.

2. In a coil, a plurality of turns of elongated material about an axis, each of said turns having a pretwist, a container encompassing said coil, a liner within said container, an adhesive means between each of said turns and at least some other turns with which it comes in contact, an adhesive means between each of the outermost turns and the interior of the liner.

3. In a coil of the type which is payed out from the inside, a plurality of turns of elongated material wound about an axis, the innermost turns being spaced from said axis so as to leave an axial cavity, a container encompassing said coil, a payout opening through the container at at least one end of the axial cavity, adhesive means releasably securing each of the outermost turns of elongated material of said coil to the inside of said container, and adhesive means releasably securing each turn of said coil to at least some other turns with which said turn comes in contact, said securing means being substantially only of sufficient strength to maintain the turns in their predetermined positions in the coil prior to paying out, but releasing easily when said turns are actually pulled out of place while being payed out.

4. The method of winding coils of elongated material which includes the steps of winding a plurality of turns of elongated material about an axis and wrapping the wound coil in a container and applying an adhesive means between at least some of the turns of said coil and said container, said adhesive means being sufficiently strong to restrain said turns from separating from said container during normal handling and weak enough to allow easy separation when a turn is pulled during normal paying out of the elongated material.

5. A method of winding coils of elongated material as defined in claim 4, which includes the additional steps of pretwisting the elongated material which is wound into said coil.

6. In a coil of elongated material, a plurality of turns of said material about an axis, a container encompassing said coil, adhesive turn-to-turn restraint means interposed between the turns of said coil and adhesive turn-to-container restraint means interposed between the container and the turns of the last layer to be unwound when said coil is payed out.

7. In a coil as defined in claim 6, wherein the turns are pretwisted.

8. The method of winding coils of elongated material which comprises the steps of winding a plurality of turns of elongated material about an axis and during said winding applying an adhesive agent between each turn and other turns with which it comes in contact, said adhesive agent being sufficiently strong to restrain said turns from separating from each other during normal handling and weak enough to allow easy separation when a turn is pulled during normal paying out of the elongated material, wrapping the wound coil in a container and applying an adhesive means between at least some of the turns of said coil and said container, said adhesive means being sufficiently strong to restrain said turns from separating from said container during normal handling and weak enough to allow easy separation when a turn is pulled during normal paying out of the elongated material.

9. The method of winding coils of elongated material as defined in claim 8 which includes the additional step of pretwisting material about its axis while being wound upon the coil.

BENJAMIN B. SCOTT, Jr.

References Cited in the file of this patent

UNITED STATES PATENTS

| Number | Name | Date |
|---|---|---|
| 360,108 | Palmer | Mar. 29, 1887 |
| 675,801 | Stiles | June 4, 1901 |
| 795,279 | Hadley | July 25, 1905 |
| 825,291 | Bauer | July 10, 1906 |
| 1,135,470 | Tolman | Apr. 13, 1915 |
| 1,541,683 | Buchler | June 9, 1925 |
| 1,870,519 | Leguillon | Aug. 9, 1932 |
| 1,889,011 | Baumhuter | Nov. 29, 1932 |
| 1,915,843 | Wright | June 27, 1933 |
| 1,950,738 | Mills | Mar. 13, 1934 |
| 2,243,624 | Gazet | May 27, 1941 |
| 2,344,079 | Burgeni et al. | Mar. 14, 1944 |
| 2,385,612 | Coutlee | Sept. 25, 1945 |

FOREIGN PATENTS

| Number | Country | Date |
|---|---|---|
| 182,574 | Great Britain | July 7, 1922 |
| 407,786 | Great Britain | Mar. 29, 1934 |
| 745,997 | France | Feb. 27, 1933 |